United States Patent [19]
Geringer

[11] Patent Number: 4,731,981
[45] Date of Patent: Mar. 22, 1988

[54] CRANKSHAFT IMPACT PROTECTOR

[75] Inventor: Miles S. Geringer, Milwaukee, Wis.

[73] Assignee: Tecumseh Products Company, Tecumseh, Mich.

[21] Appl. No.: 818,713

[22] Filed: Jan. 14, 1986

[51] Int. Cl.[4] ............................................ A01D 34/64
[52] U.S. Cl. ...................................... 56/17.5; 56/255; 56/320.1
[58] Field of Search ...................... 56/17.5, 255, 320.1, 56/320.2

[56] References Cited

U.S. PATENT DOCUMENTS

| | | | |
|---|---|---|---|
| 2,551,817 | 5/1951 | Taylor | 56/255 |
| 2,878,633 | 3/1959 | Mullin | 56/255 |
| 2,940,241 | 6/1960 | Stahl | 56/25.4 |
| 3,026,665 | 3/1962 | Hoff | 56/25.4 |
| 3,049,853 | 8/1962 | Horner et al. | 56/25.4 |
| 3,065,589 | 11/1962 | Summerhour | 56/25.4 |
| 3,112,596 | 12/1963 | Price | 56/11.3 |
| 3,138,910 | 6/1964 | Price et al. | 56/25.6 |
| 3,299,622 | 1/1967 | Hanson et al. | 56/17.5 |
| 3,416,295 | 12/1968 | Kaufman | 56/25.4 |
| 3,420,042 | 1/1969 | Kaufman | 56/25.4 |
| 3,601,958 | 8/1971 | Roof | 56/13.7 |
| 3,890,773 | 6/1975 | Frost | 56/255 |
| 3,894,383 | 7/1975 | Weis et al. | 56/ |
| 3,967,438 | 7/1976 | Tombers | 56/17.5 |
| 4,084,397 | 4/1978 | McGrath | 56/255 |
| 4,141,439 | 2/1979 | Lunde et al. | 192/18 R |

FOREIGN PATENT DOCUMENTS 1162057  2/1984  Canada ................................... 56/255
1499765  4/1975  United Kingdom .

OTHER PUBLICATIONS

Jacobsen advertisement dated 1986.

Primary Examiner—Stephen J. Novosad
Assistant Examiner—Terry Lee Melius
Attorney, Agent, or Firm—Jeffers, Hoffman & Niewyk

[57] ABSTRACT

A crankshaft impact protector for protecting the crankshaft of a lawnmower engine from bending beyond its elastic limit whenever a hard or immovable object like a rock or a stump is struck by the lawnmower blade. The protector has a flange for mounting on a mower deck, a mounting base for mounting the lawnmower engine thereupon and a bumper for providing physical support to the crankshaft. Impact forces experienced by the crankshaft are dissipated by the bumper of the protector and shifting of the bumper with respect to the crankshaft is prevented because the engine is integral with the crankshaft impact protector. A small clearance is provided between the bumper and the crankshaft thereby also helping to prevent soil and dust from traveling therethrough and reaching the main bearing of the engine.

20 Claims, 5 Drawing Figures

CRANKSHAFT IMPACT PROTECTOR

BACKGROUND OF THE INVENTION

The invention herein relates to a crankshaft impact protector which protects the crankshaft of a lawnmower combustion engine from bending beyond its elastic limit. The crankshaft impact protector disclosed herein also provides a mounting base whereupon the lawnmower combustion engine can be mounted. Further, the disclosed crankshaft protector helps to prevent soil and dust from reaching the crankshaft seal thereby preventing premature failure.

Prior art rotary lawnmowers are generally constructed with a combustion engine having a substantially vertically disposed crankshaft extending downward through the mower deck. A cutting blade is bolted directly to the bottom of the crankshaft so that it can rotate therewith. It is known that the striking of a hard or immovable object such as a rock or a stump by the cutting blade can bend the crankshaft while it is absorbing the impact and, further, can cause additional internal engine damage because of transmission by the crankshaft to the engine of the impact forces. Naturally, the bent crankshaft causes the lawnmower to be substantially nonfunctional and, therefore, the crankshaft must then be straightened or replaced. However, this is undesirable because replacing or straightening the crankshaft is generally comparatively expensive.

Accordingly, there is a need for a device which can absorb the impact forces from the crankshaft whenever a hard or immovable object is struck by the cutting blade such that the crankshaft is prevented from bending beyond its elastic limit. Further, there is a need to provide this device inexpensively and without adding undue weight to the lawnmower.

In the past, crankshafts have been protected from impact forces by adding a third ball bearing or sleeve bearing to the engine substantially near the end of the crankshaft. An example of this design is illustrated in U.S. Pat. No. 3,420,042. However, this design is undesirable because it significantly adds to the cost of the lawnmower and also substantially increases the overall weight.

Other attempts to protect lawnmower crankshafts from impact forces have involved the use of an additional stamping or casting mounted underneath and onto the mower deck whereby the crankshaft is prevented from deflecting beyond its elastic limit. Examples of this design are illustrated in U.S. Pat. Nos. 2,940,241 and 3,065,589. This design is also undesirable becuse the cost and the weight of the lawnmower are significantly increased. Further, this design is undesirable because it is difficult to maintain a uniform clearance between the crankshaft and the casting or stamping center bore. When an impact force is experienced, the casting or stamping frequently shifts from its original mounting position thereby resulting in contact or rubbing between the crankshaft and the center bore. Naturally, when this occurs, the casting or stamping must be recentered at a considerable cost and inconvenience to the operator.

SUMMARY OF THE INVENTION

It is the principal object of this invention to overcome the above-discussed disadvantages and problems associated with the prior art structures for the protection of lawnmower crankshafts from impact forces. More specifically, an object of this invention is to prevent or limit damage to the crankshaft or impact protector due to severe impact of a foreign object, by preventing shifting of the crankshaft supporting bumper whenever an impact force is experienced. This object of the invention is obtained by making the bumper integral with the engine mounting base. Because the bumper is integral with the engine mounting base, the bumper and power take off bearing support the crankshaft and prevent bending of the crankshaft above the bearing. Therefore, the bumper transfers the brunt of the impact to the mower deck so that no bearing misalignment or crankcase leakage results from the impact. No alignment is required between the crankshaft and the bumper and shifting of the crankshaft impact protector bumper, with respect to the crankshaft, is prevented. Accordingly, another object of the invention is to provide a crankshaft impact protector in combination with an engine mounting base for the lawnmower combustion engine.

Another object of the invention is to prevent soil, dirt and dust from reaching and thus damaging the power takeoff seal of the combustion engine. This object is accomplished by providing a bumper with a sufficiently small clearance to the crankshaft.

Further, it is an object of this invention to provide these advantages and objects inexpensively and by also keeping the lawnmower sufficiently lightweight. This object is obtained by manufacturing the crankshaft impact protector with a drawing process using a progressive type die.

In one form thereof, the invention provides a crankshaft protector for protecting a crankshaft of a lawnmower engine from undue deflection. A circular crankshaft bumper is provided o receive therethrough the crankshaft of the lawnmower engine. The bumper is connected to the engine mounting base on which the lawnmower engine can be mounted. A flange is connected to the mounting base and can be used for mounting the crankshaft protector upon a mower deck.

The invention, in one form thereof, further provides a crankshaft impact protector for protecting the crankshaft of a lawnmower engine from undue deflection and wherein a circular flange is used to mount the crankshaft protector upon a mower deck. The mower deck has an aperture for receiving therethrough the crankshaft of a lawnmower engine and the flange is mountable therearound. A first frusto-conical portion is connected to the flange and extends inwardly and upwardly therefrom. A circular engine mounting base is connected to the first frusto-conical portion and can be used for mounting a lawnmower engine thereon. A cylindrical portion is connected and extends downwardly from the engine mounting base within the first frusto-conical portion. A second frusto-conical portion is connected to the cylindrical portion and extends downwardly and inwardly therefrom. A cylindrical bumper is then connected to the second frusto-conical portion and extends downwardly therefrom. The bumper is adapted to receive the engine crankshaft.

In one form thereof, the invention further provides a crankshaft impact protector for protecting the crankshaft of a lawnmower engine from undue deflection. A bumper means is provided to receive therethrough the crankshaft of the lawnmower engine for providing support to the crankshaft when it deflects. The bumper means is connected to the engine mounting base on which a lawnmower engine can be mounted. A flange is connected to the mounting base and can be used for mounting the crankshaft protector upon a mower deck.

BRIEF DESCRIPTION OF THE DRAWINGS

The above-mentioned and other features and objects of this invention and the manner of obtaining them will become more apparent, and the invention itself will be better understood by reference to the following description of an embodiment of the invention, taken in conjunction with the accompanying drawings wherein.

Corresponding reference characters indicate corresponding parts throughout the several views of the drawings.

Figure 1:
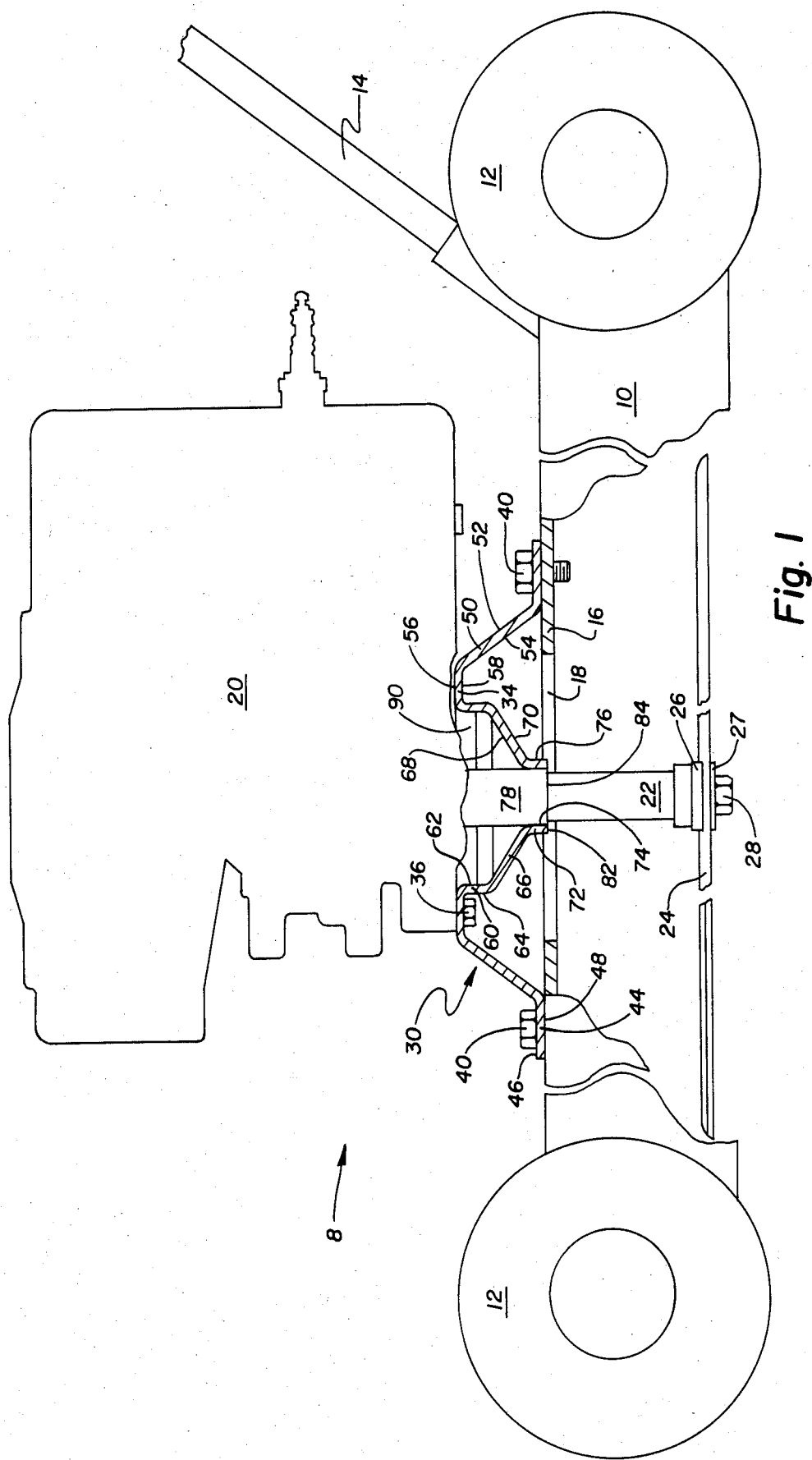
FIG. 1 is a side elevational view of a lawnmower with a cut away side view of the crankshaft impact protector mounted in position.

The exemplifications set out herein illustrate a preferred embodiment of the invention, in one form thereof, and such exemplifications are not to be construed as limiting the scope of the disclosure or the scope of the invention in any manner.

DESCRIPTION OF A SPECIFIC EMBODIMENT

As shown in the drawings, the device according to the present invention is a crankshaft impact protector which prevents the crankshaft from bending beyond its elastic limit whenever a hard or immovable object, such as a rock or a stump, is struck by the lawnmower blade. More specifically, the device according to the present invention is a crankshaft impact protector and a mounting base for mounting a lawnmower engine thereon. Further, the device acts to keep foreign matter such as soil and dust out of the lawnmower engine power take-off seal.

Referring to FIG. 1, there is shown a conventional lawnmower generally designated as 8. Lawnmower 8 includes mower deck 10 which has rotatably connected thereto mower wheels 12. Mower deck 10 also has attached thereto mower handle 14. Mower deck 10 has a top platform 16 which includes an aperture 18 for receiving therethrough crankshaft lower portion 22 of lawnmower combustion engine 20. Cutting blade 24 is attached to crankshaft lower portion 22 through the use of bolt 28, adapter 26 and washer 27 or other suitable fastening means.

Figure 2:
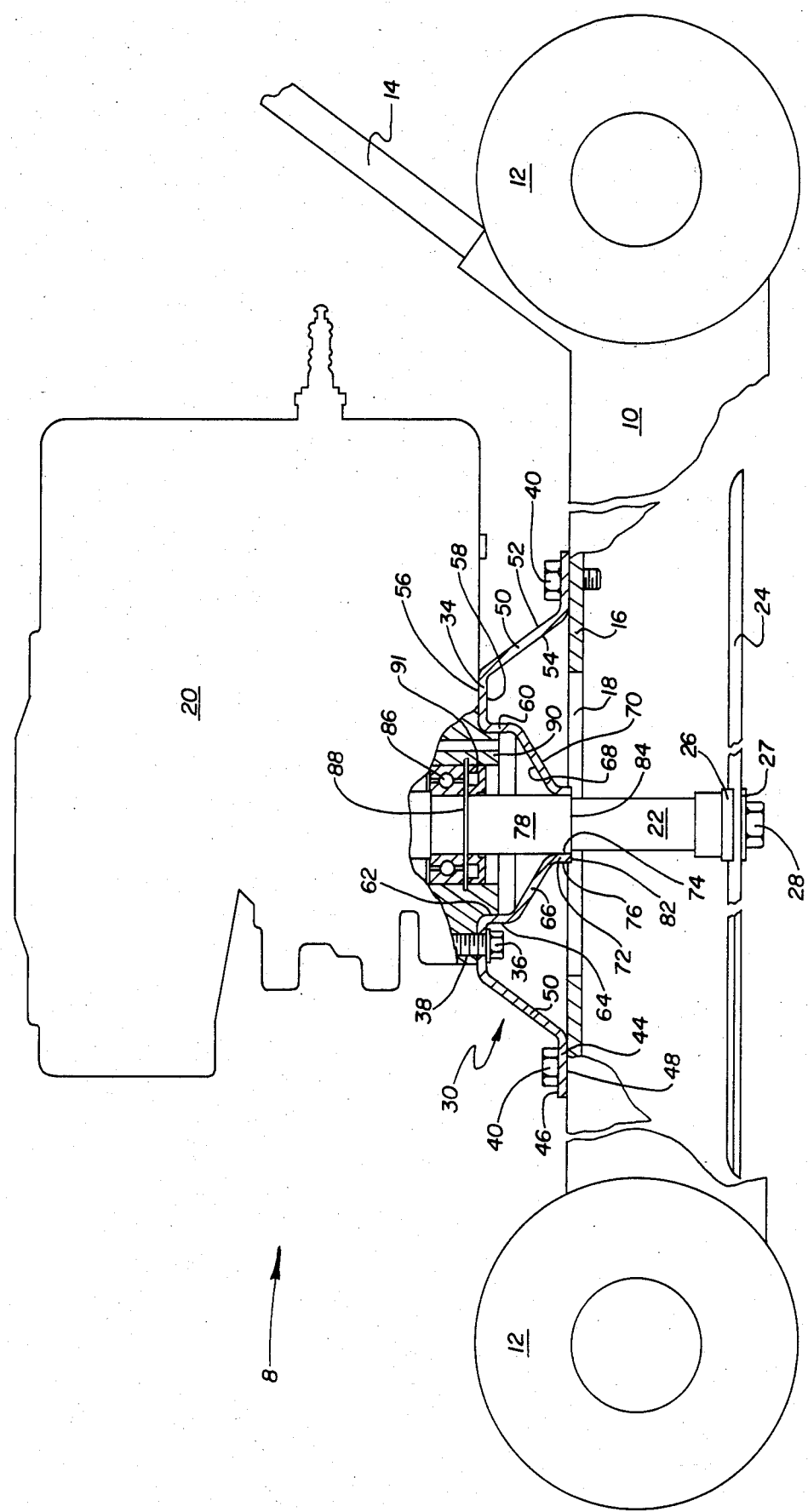
FIG. 2 is a side elevational view of the lawnmower of FIG. 1 including a cut away side elevational view of the crankshaft impact protector and the main bearing of the lawnmower engine.

As more clearly shown in FIG. 2, combustion engine 20 is mounted upon mower deck 10 through the use of crankshaft impact protector 30. That is, impact protector 30 includes engine mounting base 34 with holes 32 therein through which are received engine mounting bolts 36. Bolts 36 threadedly engage crankcase threaded holes 38, thereby fastening combustion engine 20 upon crankshaft impact protector 30. Impact protector 30, as shown in FIGS. 1 and 2, is attached to top platform 16 of mower deck 10 through the use of deck bolts 40. More specifically, deck bolts 40 are received through deck mounting holes 42 located on flange 44 of impact protector 30 and thereafter, threadedly engage mower deck top platform 16. Thus, combustion engine 20 is mounted upon mower deck 10 by way of impact protector 30.

Crankshaft impact protector 30 can be made of cast steel, ductile iron or other suitable material, or out of alumunim via a permanent mold or a diecasting process. Preferably, protector 30 is made of steel by a drawing process by means of a progressive type die. Engine mounting holes 32 and deck mounting holes 42 may be stamped or drilled out accordingly. Furthermore, it is possible to make crankshaft impact protector 30 disclosed herein integral with mower deck 10 such that both mower deck 10 and protector 30 can be manufactured by a single drawing or casting process.

Figure 3:
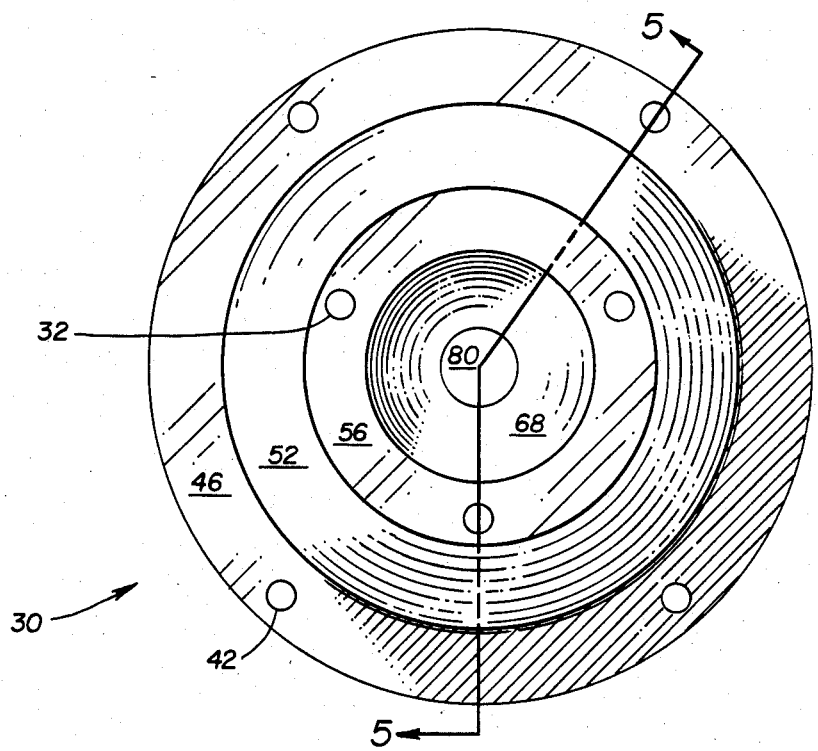
FIG. 3 is a top plan view of the crankshaft impact protector of FIGS. 1 and 2.
Figure 4:
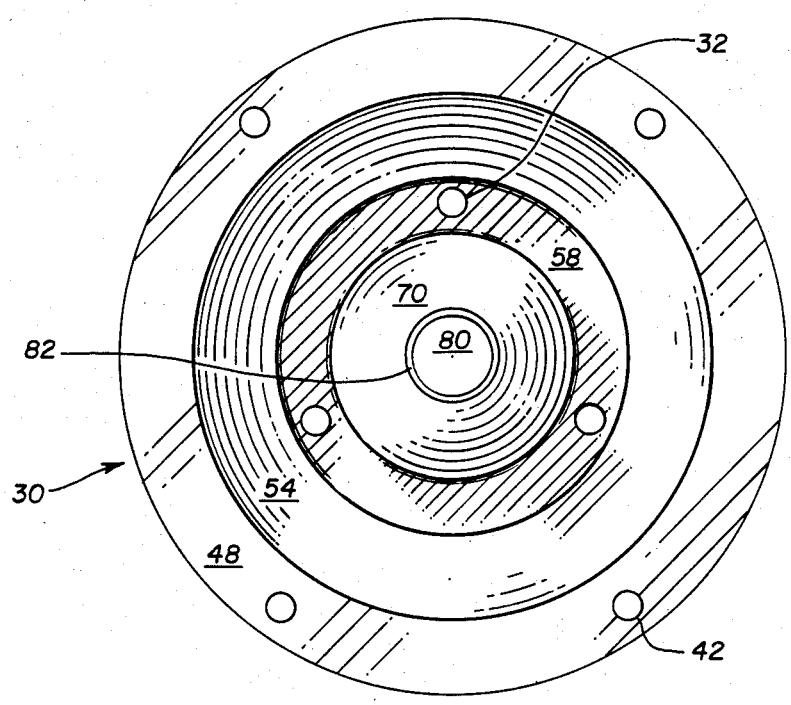
FIG. 4 is a bottom plan view of the crankshaft impact protector of FIGS. 1 and 2.
Figure 5:
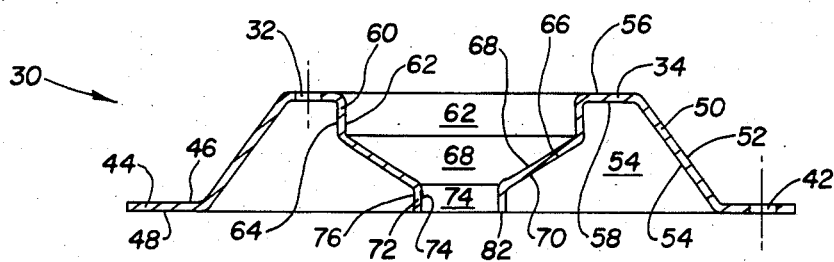
FIG. 5 is a cross sectional view of the crankshaft impact protector taken along lines 5—5 of FIG. 3.

Referring to FIGS. 3-5, crankshaft impact protector 30 has a circular deck mounting flange 44 which has an upper surface 46, lower surface 48, and deck mounting holes 42. Flange 44 is connected to frusto-conical engine support member 50 which has an upper surface 52 and a lower surface 54. Engine mounting base 34 is integrally connected to frusto-conical support member 50 and is substantially parallel to flange 44. Engine mounting base 34 has an upper surface 56, a lower surface 58 and engine mounting holes 32. Cylindrical portion 60 is integrally connected to engine mounting base 34 substantially perpendicularly thereto and extending downwardly within frusto-conical engine support member 50. Cylindrical portion 60 has an inner surface 62 and an outer surface 64. Frusto-conical crankshaft support member 66 is integrally connected to cylindrical portion 60, extending inwardly and downwardly therefrom. Frusto-conical crankshaft support member 66 has an inner surface 68 and an outer surface 70. Crankshaft bumper 72 is integrally connected to conical crankshaft support member 66 and extends generally downwardly therefrom. Crankshaft bumper 72 has an inner surface 74 and an outer surface 76. Crankshaft bumper inner surface 74 forms a cylindrical bore 80 through which there is received upper crankshaft portion 78. Crankshaft bumper 72 has a bumper ending edge 82 at which point the bumper ends.

As shown more clearly in FIG. 2, upper crankshaft portion 78 is larger in diameter than lower crankshaft portion 22. The decrease in diameter occurs at ring edge 84. Ring edge 84 is generally aligned with or below bumper edge 82.

Above crankshaft bumper 72, upper crankshaft portion 78 is pivotally supported by main ball bearing 86. Bearing washer 88 acts to keep ball bearing 86 in position. The crankcase of combustion engine 20 has a protrusion 90 which extends downwardly within cylindrical portion 60. Crankcase protrusion 90 is sized such that it fits tightly against inner surface 62 of cylindrical portion 60. A power takeoff seal 91 is provided below bearing washer 88.

In operation, it can be seen that crankshaft impact protector 30 provides an engine mounting base 34 upon which combustion engine 20 may be mounted. Further, impact protector 30, by providing circular bumper 72 with a small clearance to upper crankshaft portion 78, helps to keep soil, dirt and dust from penetrating between upper crankshaft portion 78 and crankshaft bumper inner surface 74. Thus, crankshaft bumper 72 helps to prevent foreign matter from reaching and damaging the power takeoff seal 91.

Whenever a hard or immovable object is struck by cutting blade 24, crankshaft impact protector 30 acts to help prevent the crankshaft from bening beyond its elastic limit. This is accomplished by crankshaft protector 30 by receiving and dissipating impact forces experienced by the crankshaft. That is, when an impact force is experienced, crankshaft upper portion 78 is allowed to bend within its elastic limit. If the impact forces are of such magnitude that the crankshaft would, without support, bend beyond its elastic limit, impact protector 30 provides the needed extra support and acts to keep the crankshaft upper portion 78 from bending beyond its elastic limit. This is accomplished by the crankshaft bumper 72 in combination with frusto-conical support member 66 and cylindrical portion 60 physically holding upper crankshaft portion 78 from bending beyond its elastic limit. Since engine 20 is integral with impact protector 30, shifting of bumper 72 with respect to engine 20 is prevented and realignment after experiencing an impact force is not necessary.

Furthermore, impact protector 30 acts in combination with the main bearing so as to provide added support to crankshaft lower and upper portions 22 and 78 respectively. Through this support, bending of the crankshaft above main ball bearing 86 is substantially prevented. Accordingly, because the crankshaft above main ball bearing 86 is not subjected to the impact bending forces, the cross-sectional area of the crank arm (not shown) may be reduced and the counterweight of the crankshaft (not shown) may also be reduced by the same eccentric mass of the crank arm reduction. Thus, engine 20 is lighter in weight and less costly to manufacture.

It should also be noted that because crankshaft impact protector 30 transfers most of the impact forces directly into mower deck 10, bearing misalignment is prevented, and thus, crankcase leakage is also prevented.

In addition to the above-mentioned advantages, impact protector 30 also provides additional hoop strength to crankcase protrusion 90 which holds main ball bearing 86. More specifically, cylindrical portion 60, by being tightly fitted around crankcase protrusion 90, acts to provide hoop strength to crankcase protrusion 90. This hoop strength is critical for split crankcase-type engines because, generally, the bottom half of the crankcase is fastened to the cylinder block portion of the engine by only four bolts. The hoop strength thus adds support over and above the four bolts.

While the invention has been described as having a specific embodiment, it will be understood that it is capable of further modifications. This application is therefore intended to cover any variations, uses or adaptations of the invention following the general principle thereof and including such departures from the present disclosure as come within known or customary practice in the art to which this invention pertains and fall within the limits of the appended claims.

What is claimed is:

1. For use in a lawnmower having a generally planar mower deck, a crankshaft protector for protecting the crankshaft of a lawnmower engine from undue deflection, comprising:
    a crankshaft bumper means adapted to receive therein and support said crankshaft of said lawnmower engine;
    an engine mounting base portion connected to said bumper means by a first generally frusto-conical portion said mounting base portion having an upper surface for mounting a lawnmower engine thereupon, said first frusto-conical portion extending downwardly and inwardly from said mounting base surface; and
    a flange connected to said mounting base portion for mounting said protector upon said generally planar mower deck.

2. The crankshaft protector of claim 1 wherein said engine mounting base portion and said flange are substantially planar and circular.

3. The crankshaft protector of claim 2 further comprising:
    a second frusto-conical portion integrally interconnecting said flange and said mounting base portion, said second conical portion extending inwardly and upwardly from said flange; and
    a cylindrical portion integrally connected to said mounting base portion and said first frusto-conical portion and extending within said second frusto-conical portion, and said cylindrical portion and first frusto-conical portion adapted to receive and laterally support a mating portion of said engine.

4. The crankshaft protector of claim 3 wherein said bumper means is cylindrical.

5. The crankshaft protector of claim 4 wherein said protector is made of steel.

6. The crankshaft protector of claim 5 wherein said protector is manufactured through by a drawing process using a progressive die.

7. The crankshaft protector of claim 4 wherein said flange includes a plurality of holes therein adapted to receive bolts therethrough for fastening said protector upon said mower deck.

8. The crankshaft protector of claim 4 wherein said engine mounting base portion includes a plurality of holes therein adapted to receive bolts therethrough for fastening said engine upon said mounting base.

9. The crankshaft protector of claim 4 wherein said cylindrical bumper is adapted to fit closely around said crankshaft whereby foreign matter is generally not allowed to travel between said bumper and said crankshaft.

10. The crankshaft protector of claim 1 wherein said crankshaft has a smaller diameter portion and a larger diameter portion, said smaller diameter portion adapted to have connected thereto a cutting blade and wherein said crankshaft bumper means receives and supports said larger diameter portion of said crankshaft immediately above said smaller diameter portion of said crankshaft.

11. For use in a lawnmower having a mower deck including an aperture therein, a crankshaft impact protector for protecting from undue deflection the crankshaft of a lawnmower engine, comprising:
    a generally circular flange adapted for mounting upon said mower deck having an aperture therein, said mower deck aperture being located inside of said flange when said flange is mounted upon said mower deck;
    a first frusto-conical portion connected to said flange and extending inwardly and upwardly therefrom;
    a generally circular and planar engine mounting base connected to said first frusto-conical portion and adapted for mounting a lawnmower engine thereon;
    a cylindrical portion integrally connected to said engine mounting base and extending downwardly therefrom within said first frusto-conical portion, said cylindrical portion adapted to receive and laterally support a portion of said engine therein;

a second frusto-conical portion connected to said cylindrical portion and extending downwardly and inwardly therefrom; and a cylindrical bumper means connected to said second frusto-conical portion and extending downwardly therefrom for receiving therein and supporting said engine crankshaft.

12. The crankshaft impact protector of claim 11 wherein said protector is made of steel.

13. The crankshaft impact protector of claim 12 wherein said protector is manufactured by a drawing process using a progressive die.

14. The crankshaft impact protector of claim 11 wherein said flange includes a plurality of through holes adapted to receive bolts therein for fastening said protector upon said mower deck.

15. The crankshaft impact protector of claim 11 wherein said engine mounting base includes a plurality of through holes adapted to receive bolts therein for fastening said engine upon said mounting base.

16. The crankshaft impact protector of claim 11 wherein said cylindrical bumper means forms a seal for sealing said bumper means to said crankshaft.

17. The crankshaft impact protector of claim 11 wherein said crankshaft has a smaller diameter portion and a larger diameter portion, said smaller diameter portion adapted to have connected thereto a cutting blade and wherein said bumper means receives and supports said larger diameter portion of said crankshaft immediately above said smaller diameter portion of said crankshaft.

18. The crankshaft protector of claim 17 wherein said protector is made of steel and is manufactured through a drawing process using a progressive die.

19. The crankshaft protector of claim 17 wherein said flange has a plurality of holes therein adapted to receive bolts therethrough for fastening said protector upon said mower deck and said engine mounting base has a plurality of holes therein adapted to receive bolts therethrough for fastening said engine upon said mounting base.

20. The crankshaft protector of claim 17 wherein said cylindrical bumper portion forms a seal with said crankshaft.

* * * * *

UNITED STATES PATENT AND TRADEMARK OFFICE
CERTIFICATE OF CORRECTION

PATENT NO. : 4,731,981

DATED : March 22, 1988

INVENTOR(S) : Miles S. Geringer

It is certified that error appears in the above-identified patent and that said Letters Patent is hereby corrected as shown below:

```
Col. 1, line 52, change "becuse" to --because--;
Col. 2, line 35, change "o" to --to--;
Col. 4, line 68, change "bening" to --bending--;
Claim 6, Col. 6, line 26, delete "through".
```

Signed and Sealed this

Eighteenth Day of October, 1988

Attest:

DONALD J. QUIGG

Attesting Officer         Commissioner of Patents and Trademarks